(12) United States Patent
Janeczek (10) Patent No.: US 10,127,145 B1
(45) Date of Patent: Nov. 13, 2018

(54) AUTOMATED TESTING SYSTEM AND METHOD

(71) Applicant: EMC CORPORATION, Hopkinton, MA (US)

(72) Inventor: Craig D. Janeczek, Worcester, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 141 days.

(21) Appl. No.: 15/077,183

(22) Filed: Mar. 22, 2016

(51) Int. Cl.
*G06F 11/00* (2006.01)
*G06F 11/36* (2006.01)
*G06F 17/30* (2006.01)

(52) U.S. Cl.
CPC ...... *G06F 11/3688* (2013.01); *G06F 11/3664* (2013.01); *G06F 17/30864* (2013.01)

(58) Field of Classification Search
CPC ............. G06F 11/3664; G06F 11/3668; G06F 11/3684; G06F 11/3688; G06F 17/30864
See application file for complete search history.

(56) References Cited

U.S. PATENT DOCUMENTS

| | | | | |
|---|---|---|---|---|
| 8,745,641 B1* | 6/2014 | Coker | ................. | G06F 11/3668 719/313 |
| 9,021,440 B1* | 4/2015 | Chandrasekaran | .......................... | G06F 11/3684 717/124 |
| 9,274,935 B1* | 3/2016 | Lachwani | ........... | G06F 11/3688 |
| 9,645,838 B2* | 5/2017 | Ben-Yair | ............. | G06F 9/45529 |
| 9,672,380 B2* | 6/2017 | Rosenberg | .......... | G06F 21/6245 |
| 2004/0059809 A1* | 3/2004 | Benedikt | ........... | G06F 17/30864 709/224 |
| 2005/0187930 A1* | 8/2005 | Subramanian | ...... | G06F 11/3636 |
| 2005/0193291 A1* | 9/2005 | Subramanian | ...... | G06F 11/3664 714/710 |
| 2012/0042210 A1* | 2/2012 | Glaser | ................. | G06F 11/3684 714/38.1 |
| 2012/0278741 A1* | 11/2012 | Garrity | ................... | G06Q 10/10 715/760 |
| 2013/0152047 A1* | 6/2013 | Moorthi | ................ | G06F 11/368 717/124 |
| 2014/0059381 A1* | 2/2014 | Lock | .................... | G06F 11/2294 714/25 |
| 2014/0075242 A1* | 3/2014 | Dolinina | .............. | G06F 11/3672 714/27 |
| 2014/0359371 A1* | 12/2014 | Schur | ................... | G06F 11/3684 714/38.1 |
| 2015/0095721 A1* | 4/2015 | Beskrovny | .......... | G06F 11/3664 714/48 |
| 2015/0128103 A1* | 5/2015 | Stratton | .................... | G06F 8/00 717/100 |

(Continued)

*Primary Examiner* — Joshua P Lottich
(74) *Attorney, Agent, or Firm* — Krishnendu Gupta; Konrad R. Lee (57) ABSTRACT

A method, computer program product, and computing system for crawling an interface associated with a computing system to identify one or more end nodes within the interface. Information concerning the one or more end nodes is obtained to define one or more data types for the one or more end nodes. Metadata associated with the interface is processed to define one or more testing methodologies for the one or more data types. The one or more testing methodologies are executed on the one or more end nodes.

18 Claims, 3 Drawing Sheets

(56) References Cited

U.S. PATENT DOCUMENTS

| | | | |
|---|---|---|---|
| 2016/0085662 A1* | 3/2016 | Huang | G06F 11/3668 |
| | | | 717/124 |
| 2016/0092344 A1* | 3/2016 | Bally | H04L 67/16 |
| | | | 717/124 |
| 2016/0299936 A1* | 10/2016 | Chavda | G06F 11/36 |
| 2016/0371173 A1* | 12/2016 | Ignatyev | G06F 11/3688 |
| 2017/0003989 A1* | 1/2017 | Ben-Yair | G06F 8/427 |
| 2017/0052884 A1* | 2/2017 | Ganda | G06F 11/3688 |
| 2017/0102972 A1* | 4/2017 | Ben-Yair | G06F 9/541 |

\* cited by examiner

```
{
  "@odata.context": "/redfish/v1/$metadata#AccountService/Roles/Members/$entity",
  "@odata.id": "/redfish/v1/AccountService/Roles/ReadOnly",
  "@odata.type": "#Role.1.0.0.Role",
  "AssignedPrivileges": [
    "Login",
    "ConfigureSelf"
  ],
  "Id": "ReadOnly",
  "IsPredefined": "true",
  "Name": "User Role"
}
```

FIG. 4

AUTOMATED TESTING SYSTEM AND METHOD

TECHNICAL FIELD

This disclosure relates to testing systems and, more particularly, to automated testing systems.

BACKGROUND

Modern computing systems are often remotely accessible via APIs and may include elaborate user interfaces that allow for the management of these computing systems. When developing such computing systems, these user interfaces need to be tested to ensure their proper operation and stability. Unfortunately, the testing of such user interfaces is a time consuming job, as the testing procedures are typically highly complicated and often very redundant.

SUMMARY OF DISCLOSURE

In one implementation, a computer-implemented method is executed on a computing device and includes crawling an interface associated with a computing system to identify one or more end nodes within the interface. Information concerning the one or more end nodes is obtained to define one or more data types for the one or more end nodes. Metadata associated with the interface is processed to define one or more testing methodologies for the one or more data types. The one or more testing methodologies are executed on the one or more end nodes.

One or more of the following features may be included. The interface associated with the computing system may be accessed via a network connection. Accessing the interface associated with the computing system via a network connection may include accessing an IP address associated with the interface. The metadata may be validated prior to crawling the interface associated with the computing system. The one or more end nodes may be associated with one or more of: a hardware component; and a software element. The one or more testing methodologies may include one or more of: a basic testing methodology; and an enhanced testing methodology. The metadata may be OData and the interface may be a RESTful interface.

In another implementation, a computer program product resides on a computer readable medium and has a plurality of instructions stored on it. When executed by a processor, the instructions cause the processor to perform operations including crawling an interface associated with a computing system to identify one or more end nodes within the interface. Information concerning the one or more end nodes is obtained to define one or more data types for the one or more end nodes. Metadata associated with the interface is processed to define one or more testing methodologies for the one or more data types. The one or more testing methodologies are executed on the one or more end nodes.

One or more of the following features may be included. The interface associated with the computing system may be accessed via a network connection. Accessing the interface associated with the computing system via a network connection may include accessing an IP address associated with the interface. The metadata may be validated prior to crawling the interface associated with the computing system. The one or more end nodes may be associated with one or more of: a hardware component; and a software element. The one or more testing methodologies may include one or more of: a basic testing methodology; and an enhanced testing methodology. The metadata may be OData and the interface may be a RESTful interface.

In another implementation, a computing system including a processor and memory is configured to perform operations including crawling an interface associated with a computing system to identify one or more end nodes within the interface. Information concerning the one or more end nodes is obtained to define one or more data types for the one or more end nodes. Metadata associated with the interface is processed to define one or more testing methodologies for the one or more data types. The one or more testing methodologies are executed on the one or more end nodes.

One or more of the following features may be included. The interface associated with the computing system may be accessed via a network connection. Accessing the interface associated with the computing system via a network connection may include accessing an IP address associated with the interface. The metadata may be validated prior to crawling the interface associated with the computing system. The one or more end nodes may be associated with one or more of: a hardware component; and a software element. The one or more testing methodologies may include one or more of: a basic testing methodology; and an enhanced testing methodology. The metadata may be OData and the interface may be a RESTful interface.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
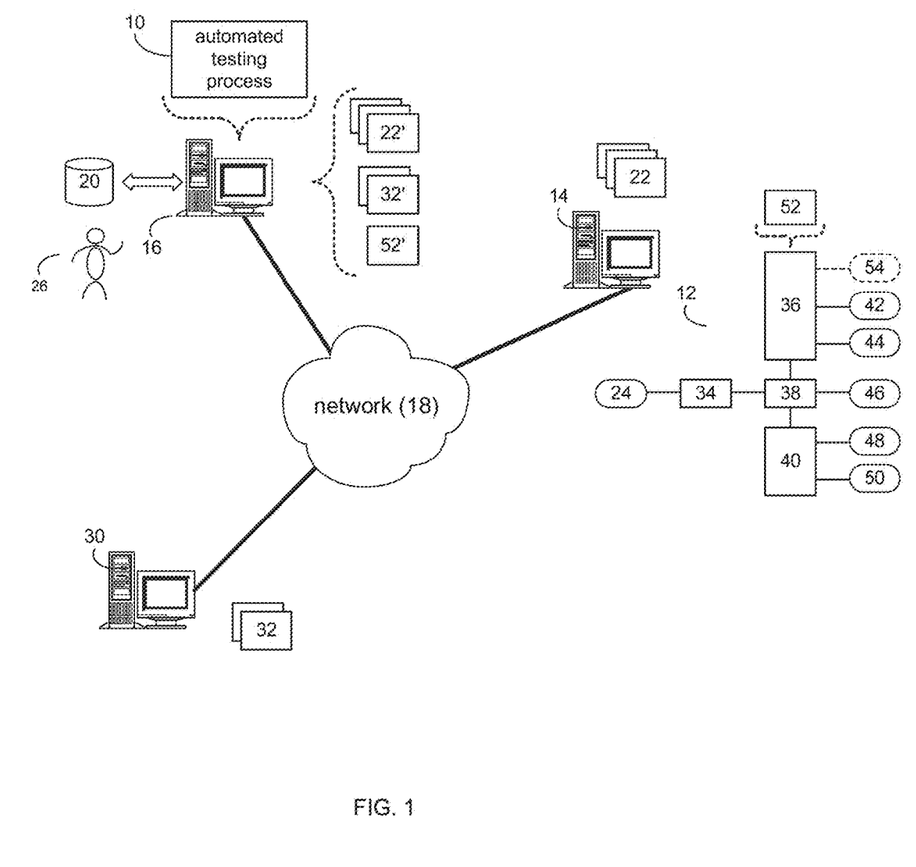
FIG. 1 is a diagrammatic view of a test system and an automated testing process 10 coupled to a distributed computing network.

System Overview:

Referring to FIG. 1, there is shown automated testing process 10. As will be discussed below in greater detail, automated testing process 10 may be a testing tool suite configured to test the functionality of an interface (e.g., interface 12) within a test system (e.g., test system 14). Automated testing process 10 may reside on and may be executed by computing device 16, which may be connected to network 18 (e.g., the Internet or a local area network). Examples of computing device 16 may include, but are not limited to: a personal computer, a laptop computer, a notebook computer, a personal digital assistant, a data-enabled cellular telephone, a server computer, a series of server computers, a mini computer, a mainframe computer, and a dedicated network device.

The instruction sets and subroutines of automated testing process 10, which may be stored on storage device 20 coupled to computing device 16, may be executed by one or more processors (not shown) and one or more memory architectures (not shown) included within computing device 16. Examples of storage device 20 may include but are not limited to: a hard disk drive; a tape drive; an optical drive; a RAID device; a random access memory (RAM); a read-only memory (ROM); and all forms of flash memory storage devices.

Examples of interface 12 may include but are not limited to a RESTful interface that utilizes metadata 22, wherein examples of test system 14 may include but is not limited to various IT devices (e.g., storage processors and disk array systems) and examples of metadata 22 may include but is not limited to OData metadata. As is known in the art, representational state transfer (REST) is an architectural style that includes a coordinated set of architectural constraints applied to components, connectors, and data elements, within a distributed computing system (e.g., test system 14). When an interface conforms to the constraints of REST, those conforming interfaces are said to be RESTful interfaces.

Additionally and as is known in the art, OData (i.e., Open Data Protocol) is an open protocol that allows for the creation and consumption of queryable and interoperable RESTful APIs (i.e., application program interfaces) in a standardized manner that allows users to publish and edit resources, that are identified using URLs and defined in a data model using simple HTTP messages. An example of such a RESTful APIs includes, but is not limited to, a Redfish™ API.

Assume for the following example that test system 14 is an IT component (e.g., a storage processor) that includes various hardware components (such as processors, memory modules, storage devices, power supplies, cooling fans, and temperature sensors; not shown). Further, assume that computing device 16 is configured to access test system 14 using a RESTful API (e.g., API 24). Accordingly and to access API 24, computing device 16 may enter an IP address (e.g., 192.168.1.100) that is associated with test system 14 into e.g., a web browser (not shown).

Figure 2:
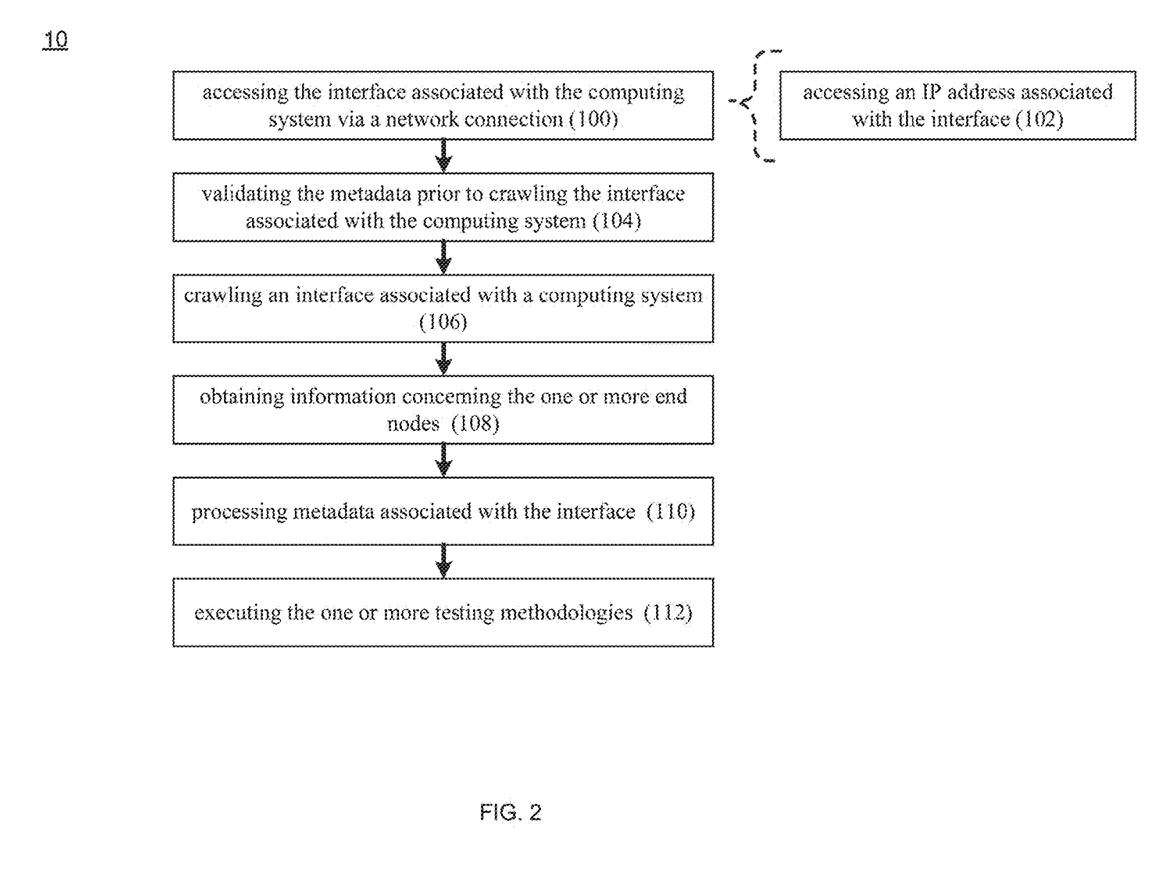
FIG. 2 is a flow chart of the automated testing process of FIG. 1.

The Automated Testing Process:

As discussed above, automated testing process 10 may be utilized to test the functionality of an interface within a test system (e.g., test system 14). Referring also to FIG. 2, automated testing process 10 may access 100 interface 12 associated with test system 14 via e.g., a network connection through network 18. Accordingly, computing device 16 does not need to be proximate or directly coupled to test system 14, as computing device 16 and test system 14 may be in disparate locations.

As discussed above, interface 12 may be a RESTful interface. And when accessing 100 interface 12 associated with test system 14 via the network connection, automated testing process 10 may access 102 an IP address associated with interface. 12. Specifically, user 26 of computing device 16 may enter an IP address (e.g., 192.168.1.100) that is associated with test system 14 into e.g., a web browser (not shown) and user 26 may be redirected to a RESTful API (e.g., API 24).

API 24 may be configured to expose/identify/locate metadata 22 that may be used to interpret and understand the structure & functionality of interface 12. As discussed above, an example of metadata 22 may include, but is not limited, to OData metadata.

Accordingly and upon accessing interface 12 associated with test system 14, automated testing process 10 may validate 104 metadata 22. When validating 104 metadata 22, automated testing process 16 may make a copy of metadata 22 onto computing device 16 (resulting in copy of metadata 22'). For example, automated testing process 16 may request metadata 22 from test system 14 and may store a local copy (e.g., metadata 22') on test system 14, wherein metadata 22 may be configured to define the entity types within interface 12 and the manner in which various portions (e.g., pages/subpages/end nodes) of interface 12 may react/respond to queries made by automated testing process 10. Alternative and when validating 104 metadata 22, automated testing process 10 may be configured to process metadata 22 while stored on test system 14 (without making a local copy of metadata 22).

Additionally and when validating 104 metadata 22, automated testing process 10 may review and process metadata 22 to look for errors and to locate supplemental metadata that may be located at remote locations (e.g., different locations within test system 14 and/or locations on remote computers, such as remote computing device 30).

For example, metadata 22 may be configured to locate (e.g., via URLs and/or IP addresses) additional metadata (e.g., additional metadata 32) that, in this example, is located on remote computing device 30. Accordingly, automated testing process 10 may request additional metadata 32 from remote computing device 30 and may store a local copy (e.g., additional metadata 32') on test system 14. Additional metadata 32' may also be configured to define the entity types within interface 12 and the manner in which various portions (e.g., pages/subpages/end nodes) of interface 12 may react/respond to queries made by automated testing process 10. Alternative and when validating 104 metadata 22, automated testing process 10 may be configured to process additional metadata 32 while stored on remote computing device 30 (without making a local copy of additional metadata 32).

Once all metadata (e.g., metadata 22 and additional metadata 32) is located (and copied onto computing device 16 resulting in metadata 22' and metadata 32'), this metadata may be validated 104 by automated testing process 10 to confirm that this metadata adheres to any required standards. For the following example, assume that automated testing process 10 makes copies of metadata 22. 32 resulting in metadata 22', 32'. Automated testing process 16 may validate 104 metadata 22' 32' to confirm that metadata 22', 32' adheres to (in this example) the OData standards concerning e.g., wording and formatting and to confirm that any referenced links (to e.g., remote metadata 32) are valid and accessible.

Once validated 104 (assuming that the validation step is desired and/or performed), automated testing process 10 may crawl 106 interface 12 associated with test system 14 to identify one or more end nodes within interface 12. For example, interface 12 may include a root page (e.g., root page 34), one or more intermediate pages (e.g., intermediate pages 36, 38, 40) and one or more end nodes (e.g., end nodes 42, 44, 46, 48, 50).

As discussed above, examples of test system 14 may include but are not limited to various IT devices (e.g., storage processors and disk array systems), wherein interface 12 may be configured to map out the various functionality of the IT device. For example, intermediate page 36 may be associated with storage devices (not shown) included within test system 14, wherein intermediate page 38 may be associated with a microprocessor (not shown) included within test system 14, and intermediate page 40 may be associated with power supplies (not shown) included within test system 14.

End nodes within interface 12 may be associated with various entities, examples of which may include but are not limited to hardware components included within e.g., test system 14 or software elements of interface 12 and/or software being executed on test system 14. For the following discussion, the end nodes of interface 12 are going to be described as being associated with hardware components of test system 14. However and as discussed above, it is understood that these end nodes may also represent software elements of interface 12 and/or software being executed on test system 14.

Accordingly and for the following example, assume that end nodes 42, 44 may concern thermal sensors (not shown) associated with storage devices (not shown) included within test system 14; end node 46 may concern the level of utilization of a microprocessor (not shown) included within test system 14, and end nodes 48, 50 may concern fan speed sensors (not shown) associated with power supplies (not shown) included within test system 14.

Continuing with the above-stated example, when automated testing process 10 crawls 106 interface 12 associated with test system 14 to identify one or more end nodes within interface 12, automated testing process 10 may discover the topology of interface 12 by crawling through the pages (e.g., root page 34) and intermediate pages (e.g., intermediate pages 36, 38, 40) of interface 12 to find the end nodes (e.g., end nodes 42, 44, 46, 48, 50) included within interface 12.

When crawling 106 pages (e.g., root page 34 and intermediate pages 36, 38, 40), if automated testing process 10 determines that additional metadata (e.g., additional metadata 52) is included within these pages (e.g., root page 34 and intermediate pages 36, 38, 40), automated testing process 10 may e.g., obtain copies of this additional metadata (e.g., additional metadata 52) included within these pages (e.g., root page 34 and intermediate pages 36, 38, 40) and copy this additional metadata (e.g., additional metadata 52) onto e.g., computing device 16 (e.g., as metadata 52').

Once the topology of interface 12 is defined when automated testing process 10 crawls 106 interface 12, automated testing process 10 may process metadata (e.g., metadata 22', 32', 52') to obtain 108 information concerning the one or more end nodes (e.g., end nodes 42, 44, 46, 48, 50) to define one or more data types (e.g., an OData type if interface 12 utilizes OData metadata) for the one or more end nodes (e.g., end nodes 42, 44, 46, 48, 50). Specifically, automated testing process 10 may process the metadata associated with end nodes 42, 44, 46, 48, 50 to obtain 108 information concerning end nodes 42, 44, 46, 48, 50 so that a data type may be defined for each of end nodes 42, 44, 46, 48, 50. When processing end nodes 42, 44, 46, 48, 50, automated testing process 10 may issue a "get" command on each of end nodes 42, 44, 46, 48, 50 to determine their data type.

Figure 3:
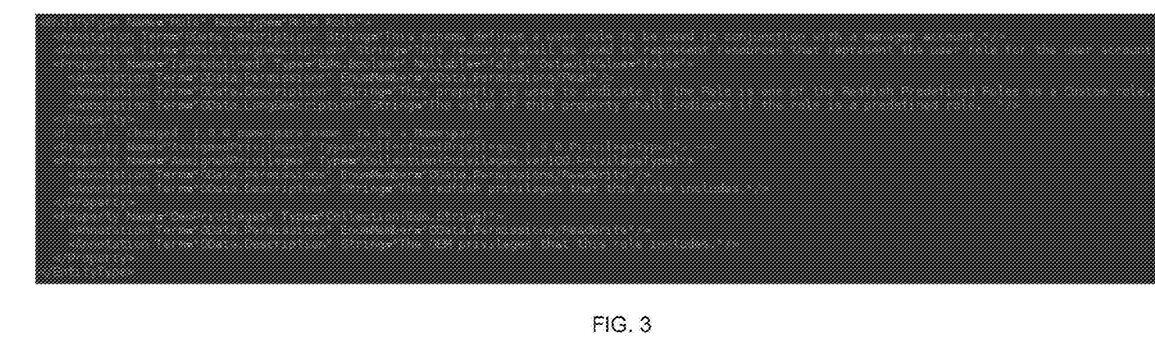
FIG. 3 is an example of metadata associated with an end node.
Figure 4:
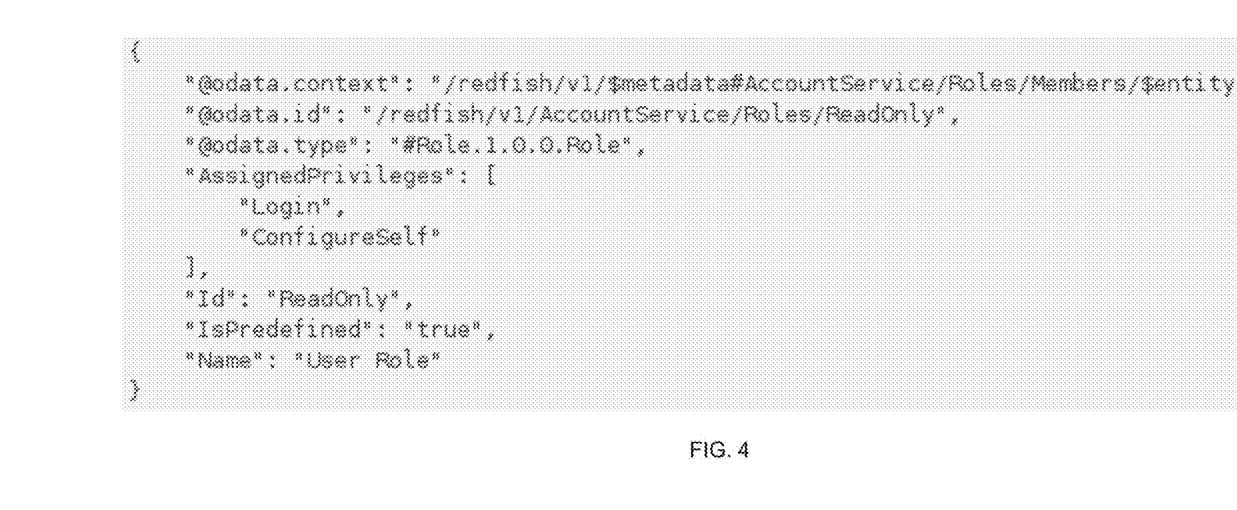
FIG. 4 is an example of data returned in response to a "get" command.

For a system that uses OData, the data type determined (e.g., returned from end nodes 42, 44, 46, 48, 50) may most likely be an instance of an EntityType or a ComplexType. Both of these OData-defined data types may be used as the framework, wherein the developer inserts the specific properties that the endpoint will return when the above-described GET operation is performed. Referring also to FIG. 3 there is shown one example of the type of data that may be defined within metadata for an end node (e.g., end nodes 42, 44, 46, 48, 50). Referring also to FIG. 4, there is shown one example of the type of data that may be returned in response to a "get" command issued upon an end node (e.g., end nodes 42, 44, 46, 48, 50) by automated testing process 10.

In addition to the end nodes (e.g., end nodes 42, 44, 46, 48, 50), automated testing process 10 may process metadata (e.g., metadata 22', 32', 52') to obtain information concerning the pages (e.g., root page 34 and intermediate pages 36, 38, 40) included within interface 12 to define a data type (e.g., an OData type if interface 12 utilizes OData metadata) for each of root page 34 and intermediate pages 36, 38, 40.

Once automated testing process 10 obtains 108 information concerning end nodes 42, 44, 46, 48, 50 and defines a data type for each of end nodes 42, 44, 46, 48, 50, automated testing process 10 may process 110 metadata (e.g., metadata 22', 32', 52') associated with interface 12 to define one or more testing methodologies for the one or more data types.

Since the metadata (e.g., metadata 22', 32', 52') has been validated 104, metadata 22', 32', 52' should include information for each data type included within interface 12. Accordingly, automated testing process 10 may process 110 metadata 22', 32', 52' to define one or more testing methodologies for each of these data types. Specifically, metadata 22', 32', 52' may define the type(s) of response that should be expected from each data type. And being a data type is associated with each of (in this example) end nodes 42, 44, 46, 48, 50, the type(s) of response expected from end nodes 42, 44, 46, 48, 50 would be defined for each end node that is operating properly.

Once the appropriate testing methodologies are defined, automated testing process 10 may execute 112 these testing methodologies on the one or more end nodes (e.g., end nodes 42, 44, 46, 48, 50). Examples of these testing methodologies may include but are not limited to one or more basic testing methodologies and one or more enhanced testing methodologies.

As discussed above, end nodes 42, 44 may concern thermal sensors (not shown) associated with storage devices (not shown) included within test system 14; end node 46 may concern the level of utilization of a microprocessor (not shown) included within test system 14, and end nodes 48, 50 may concern fan speed sensors (not shown) associated with power supplies (not shown) included within test system 14.

Accordingly and concerning end node 46 (i.e., the level of utilization of a microprocessor (not shown) included within test system 14), a basic testing methodology may include automated testing process 10 executing 112 a test to confirm that the data being received from end node 46 is formatted as a percentage or is within a defined range (e.g., 0-100%). An enhanced testing methodology may include automated testing process 10 executing 112 a test that initially measures utilization of the processor and subsequently loads the processor and remeasures the utilization of the processor while under load.

As discussed above, the end nodes within interface 12 may be associated with various entities, examples of which may include but are not limited to hardware components included within e.g., test system 14 or software elements of interface 12 and/or software being executed on test system 14. Concerning the software elements, an end node may be associated with a particular software function. For example, an end node may be associated with a user registration page that allows an administrator to define users that can access test system 14. Accordingly and in such a situation, a basic testing methodology may include automated testing process 10 executing 112 a test to confirm that the end node is capable of receiving text-based data (e.g., full name, user name, password). An enhanced testing methodology may include automated testing process 10 executing 112 a test that runs a test script that defines five users, confirms the ability of these newly-created users to login into test system 14, and subsequently deletes the five newly-created users.

As discussed above, metadata 22', 32', 52' may define the type(s) of response that should be expected from each data type, wherein a data type is associated with each of (in this example) end nodes 42, 44, 46, 48, 50. Accordingly and when executing 112 the testing methodologies on the end nodes (e.g., end nodes 42, 44, 46, 48, 50), end nodes of similar data types may be tested using the same tests. Accordingly and as discussed above, if end nodes 42, 44 (which both concern thermal sensors associated with storage devices included within test system 14) are the same data type, automated testing process 10 may test end nodes 42, 44 using the same testing methodologies. Further, if end nodes 48, 50 (which both concern fan speed sensors associated with power supplies included within test system 14) are the same data type, automated testing process 10 may test end nodes 48, 50 using the same testing methodologies. When executing 112 tests of end nodes that are the same data types, automated testing process 10 may test these end nodes in a sequential (or parallel) automated fashion.

Further, in the event that e.g., during development, a new end node is added to interface 12, wherein this newly-added end node is the same data type as an existing end node within interface 12, automated testing process 10 may detect this additional end node and automatically test this additional end node based upon the data type.

For example, if new end node 54 is added to interface 12 and concerns a third thermal sensor, automated testing process 10 may detect (e.g., during subsequent crawling 106 of interface 12) this additional end node (e.g., new end node 54) and may execute 112 the same automated testing methodologies on new end node 54 that were executed on end nodes 42, 44 (as end nodes 42, 44 and new end node 54 are all associated with thermal sensors and are all the same data type).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through a local area network/a wide area network/the Internet (e.g., network 18).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    validating metadata of an interface associated with a computing system including validating the metadata of the interface against one or more formatting standards associated with the metadata;
    crawling the interface associated with the computing system to identify one or more end nodes within the interface in response to validating the metadata of the interface;
    processing the validated metadata of the interface to obtain information concerning the one or more end nodes to define one or more data types for the one or more end nodes, wherein the one or more data types define one or more types of responses expected from the one or more end nodes;
    processing the validated metadata of the interface to define one or more testing methodologies for the one or more data types; and
    executing the one or more testing methodologies on the one or more end nodes based upon, at least in part, the one or more types of responses expected from the one or more end nodes.

2. The computer-implemented method of claim 1 further comprising:
    accessing the interface associated with the computing system via a network connection.

3. The computer-implemented method of claim 2 wherein accessing the interface associated with the computing system via a network connection includes:
    accessing an IP address associated with the interface.

4. The computer-implemented method of claim 1 wherein the one or more end nodes are associated with one or more of:
    a hardware component; and
    a software element.

5. The computer-implemented method of claim 1 wherein the one or more testing methodologies includes one or more of:
    a basic testing methodology; and
    an enhanced testing methodology.

6. The computer-implemented method of claim 1 wherein the metadata is OData and the interface is a RESTful interface.

7. A computer program product residing on a non-transitory computer readable medium having a plurality of instructions stored thereon which, when executed by a processor, cause the processor to perform operations comprising:
    validating metadata of an interface associated with a computing system including validating the metadata of the interface against one or more formatting standards associated with the metadata;
    crawling the interface associated with the computing system to identify one or more end nodes within the interface in response to validating the metadata of the interface;
    processing the validated metadata of the interface to obtaining information concerning the one or more end nodes to define one or more data types for the one or more end nodes, wherein the one or more data types define one or more types of responses expected from the one or more end nodes;
    processing the validated metadata of the interface to define one or more testing methodologies for the one or more data types; and
    executing the one or more testing methodologies on the one or more end nodes based upon, at least in part, the one or more types of responses expected from the one or more end nodes.

8. The computer program product of claim 7 further comprising instructions for:
    accessing the interface associated with the computing system via a network connection.

9. The computer program product of claim 8 wherein accessing the interface associated with the computing system via a network connection includes:
    accessing an IP address associated with the interface.

10. The computer program product of claim 7 wherein the one or more end nodes are associated with one or more of:
    a hardware component; and
    a software element.

11. The computer program product of claim 7 wherein the one or more testing methodologies includes one or more of:
    a basic testing methodology; and
    an enhanced testing methodology.

12. The computer program product of claim 7 wherein the metadata is OData and the interface is a RESTful interface.

13. A computing system including a hardware processor and hardware memory configured to perform operations comprising:
 validating metadata of an interface associated with a computing system including validating the metadata of the interface against one or more formatting standards associated with the metadata;
 crawling the interface associated with the computing system to identify one or more end nodes within the interface in response to validating the metadata of the interface;
 processing the validated metadata of the interface to obtaining information concerning the one or more end nodes to define one or more data types for the one or more end nodes, wherein the one or more data types define one or more types of responses expected from the one or more end nodes;
 processing the validated metadata of the interface to define one or more testing methodologies for the one or more data types; and
 executing the one or more testing methodologies on the one or more end nodes based upon, at least in part, the one or more types of responses expected from the one or more end nodes.

14. The computing system of claim 13 further configured to perform operations comprising:
 accessing the interface associated with the computing system via a network connection.

15. The computing system of claim 14 wherein accessing the interface associated with the computing system via a network connection includes:
 accessing an IP address associated with the interface.

16. The computing system of claim 13 wherein the one or more end nodes are associated with one or more of:
 a hardware component; and
 a software element.

17. The computing system of claim 13 wherein the one or more testing methodologies includes one or more of:
 a basic testing methodology; and
 an enhanced testing methodology.

18. The computing system of claim 13 wherein the metadata is OData and the interface is a RESTful interface.

* * * * *